(12) United States Patent
Schoppmeier

(10) Patent No.: US 9,596,177 B2
(45) Date of Patent: Mar. 14, 2017

(54) METHOD FOR A RETRANSMISSION ROUNDTRIP CORRECTION

(75) Inventor: Dietmar Schoppmeier, Unterhaching (DE)

(73) Assignee: Lantiq Deutschland GmbH, Neubiberg (DE)

( * ) Notice: Subject to any disclaimer, the term of this patent is extended or adjusted under 35 U.S.C. 154(b) by 588 days.

(21) Appl. No.: 13/444,931

(22) Filed: Apr. 12, 2012

(65) Prior Publication Data

US 2013/0272143 A1 Oct. 17, 2013

(51) Int. Cl.
*H04K 1/00* (2006.01)
*H04L 12/721* (2013.01)
*H04L 12/805* (2013.01)
*H04L 12/841* (2013.01)

(52) U.S. Cl.
CPC ............ *H04L 45/70* (2013.01); *H04L 47/283* (2013.01); *H04L 47/36* (2013.01)

(58) Field of Classification Search
CPC ........ H04L 45/70; H04L 47/36; H04L 47/283
USPC ....................................................... 370/252
See application file for complete search history.

(56) References Cited

U.S. PATENT DOCUMENTS

| | | | |
|---|---|---|---|
| 7,417,956 B2 | 8/2008 | Nakazawa | |
| 8,284,795 B2 | 10/2012 | Peeters et al. | |
| 8,320,248 B2 * | 11/2012 | Christiaens | H04L 1/1809 370/230 |
| 8,689,072 B2 * | 4/2014 | Schoppmeier | H04L 1/1896 714/748 |
| 2007/0147437 A1 * | 6/2007 | Yasui | H04L 1/1854 370/519 |
| 2007/0195820 A1 * | 8/2007 | So | H04L 1/0007 370/470 |
| 2007/0286070 A1 * | 12/2007 | Schliwa-Bertling et al. 370/229 | |
| 2008/0225847 A1 * | 9/2008 | Manjunatha | H04L 47/32 370/389 |
| 2009/0116402 A1 * | 5/2009 | Yamasaki | 370/253 |
| 2010/0031108 A1 * | 2/2010 | Peeters | 714/748 |
| 2010/0042883 A1 | 2/2010 | Heise | |
| 2010/0046549 A1 * | 2/2010 | Heise | 370/474 |
| 2010/0111095 A1 * | 5/2010 | Trossell | H04L 1/1607 370/402 |
| 2010/0157795 A1 * | 6/2010 | Konishi | H04L 12/1836 370/230 |

(Continued)

*Primary Examiner* — Faisal Choudhury
(74) *Attorney, Agent, or Firm* — Eschweiler & Potashnik, LLC

(57) ABSTRACT

The present disclosure relates generally to communication systems and more particularly to Digital Subscriber Line (DSL) and wireless communication systems. One embodiment relates to a method of processing data in a communication system. In this method, a data stream is received by a transmitter and packaged into discrete data units prior to transmission. The size of a data unit depends upon the details of the embodiment, and is estimated by communication system prior to data transmission. Once a data unit is transmitted from the transmitter to the receiver, the receiver sends an acknowledgement that the data unit is received. Knowledge of the roundtrip time delay between transmission of the data unit and reception of the acknowledgement allows the communication system to determine an optimum data unit size to maximize throughput. Other methods and systems are also disclosed.

39 Claims, 12 Drawing Sheets

(56) References Cited

U.S. PATENT DOCUMENTS

| | | | | |
|---|---|---|---|---|
| 2011/0015769 A1* | 1/2011 | Haatainen | ............ | H04J 3/0667 700/94 |
| 2011/0310911 A1* | 12/2011 | Froehler | ............... | H04L 1/1874 370/465 |
| 2012/0204074 A1* | 8/2012 | Schoppmeier | ........ | H04L 1/1896 714/749 |
| 2013/0176854 A1* | 7/2013 | Chisu | .................... | H04W 80/06 370/241 |

* cited by examiner

METHOD FOR A RETRANSMISSION ROUNDTRIP CORRECTION

FIELD OF DISCLOSURE

The present invention relates generally to communication systems and more particularly to Digital Subscriber Line (DSL) and wireless communication systems.

SUMMARY

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

One embodiment relates to a method of processing data in a communication system. In this method, a data stream is received by a transmitter and packaged into discrete data units prior to transmission. The size of a data unit depends upon the details of the embodiment, and is estimated by communication system prior to data transmission. Once a data unit is transmitted from the transmitter to a receiver, the receiver sends an acknowledgement to the transmitter that the data unit was received. Knowledge of the roundtrip time delay between transmission of the data unit and reception of the acknowledgement allows the communication system to optimize the data unit size and maximize its throughput. Other methods and systems are also disclosed.

The following description and annexed drawings set forth in detail certain illustrative aspects and implementations of the invention. These are indicative of only a few of the various ways in which the principles of the invention may be employed.

DETAILED DESCRIPTION

Figure 1:
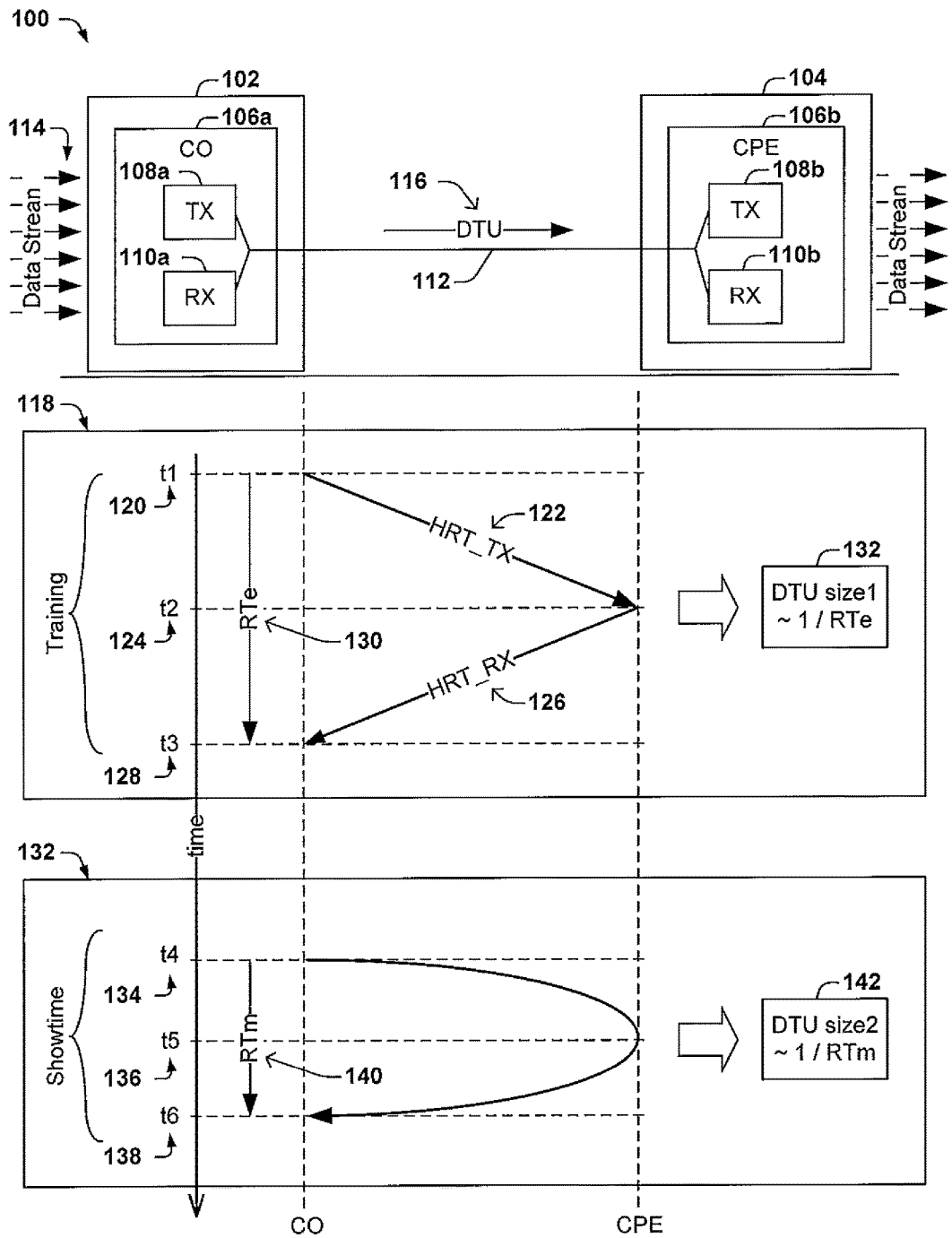
FIG. 1 illustrates some embodiments of a DSL communication system.

One or more implementations of the present invention are now described with reference to the attached drawings, wherein like reference numerals are used to refer to like elements throughout, and wherein the various structures are not necessarily drawn to scale. In the following description, for purposes of explanation, numerous specific details are set forth in order to facilitate understanding. It may be evident, however, to one of ordinary skill in the art, that one or more aspects described herein may be practiced with a lesser degree of these specific details. In other instances, known structures and devices are shown in block diagram form to facilitate understanding. Although examples of retransmission schemes are described below in the context of VDSL and ADSL systems, it should be noted that the invention in general is applicable to any communication system.

FIG. 1 illustrates some embodiments of a DSL communication system 100 comprising an operator's site 102 comprising a first transceiver 106a, and a subscriber's site 104 comprising a second transceiver 106b. The first transceiver 106a comprises a first transmitter 108a and a first receiver 110a, and the second transceiver 106b comprises a second transmitter 108b and a second receiver 110b. The first transceiver 106a and second transceiver 106b are coupled via a subscriber line 112.

During communication the first transceiver 106a passes an incoming data stream 114 (e.g., analogue voice-over IP) for transmission in the form of a data transmission unit (DTU) 116 having a DTU size which is based on an expected roundtrip time delay between the first transceiver 106a and the second transceiver 106b. Since the roundtrip time delay cannot be directly measured before transmission, the communication system 100 must estimate it during an initialization phase 118 (i.e., training), in which each side communicates its half roundtrip (HRT) to the other side. The HRT of the operator's site 102 (HRT_TX) 122, which is transmitted at 120, corresponds to the estimated time for a DTU transmitted by the transmitter 108a to reach the subscriber's site 104. Similarly, the HRT of the subscriber's site 104 (HRT_RX) 126, which is transmitted at 124, corresponds to the estimated time for an acknowledgement that the DTU was received by the receiver 110b to reach the operators site 102. At 128 the communicated HRT values are used to calculate an estimated roundtrip time delay (RTe) 130 as the sum of HRT_TX 122 and HRT_RX 126. An initial DTU size 132 is set based on RTe. The initial DTU size 132 is inversely-proportional to RTe.

For robust communication the RTe value and corresponding initial DTU size are set to conservative values to limit data transfer errors. This conservative estimate results in an unnecessary performance limitation.

Therefore, the present disclosure measures roundtrip time delay for a DSL communication system during DTU transmission 132 (i.e., showtime), and updates the initial DTU size based on the measured roundtrip delays. In particular, in 132 the first transceiver 106a receives an incoming data stream 114 and transmits a DTU at 134. Upon the second transceiver 106b receiving the DTU, the second transmitter 108b sends an acknowledgement that the DTU received at 136. The first transceiver 106a receives the acknowledgement at 138, and calculates a measured roundtrip time delay (RTm) as the difference between the time that the DTU was transmitted 134 and the time that the acknowledgement that the DTU was received 138. A second DTU size 142 is determined to be inversely-proportional to RTm, wherein the second DTU size will be larger than the first DTU size by a factor of RTe/RTm, thus resulting in a throughput gain factor of RTe/RTm.

The determination of the DTU size is a key factor in optimizing the efficiency of the communication system. A DTU size that is too small can waste available throughput (e.g., bandwidth), while a DTU size that is too large can result in an incomplete delivery of data, multiple retransmissions of a single data unit, corruption of the DTU, or a combination thereof. Accordingly, the present disclosure relates to a communication system arranged to improve the efficiency of data throughput by increasing the DTU size to account for overly-conservative roundtrip delays used during training. The communications system is configured to leverage existing retransmission protocols, while adding new function elements to tune the DTU size for various embodiments of a communications system.

Figure 2:
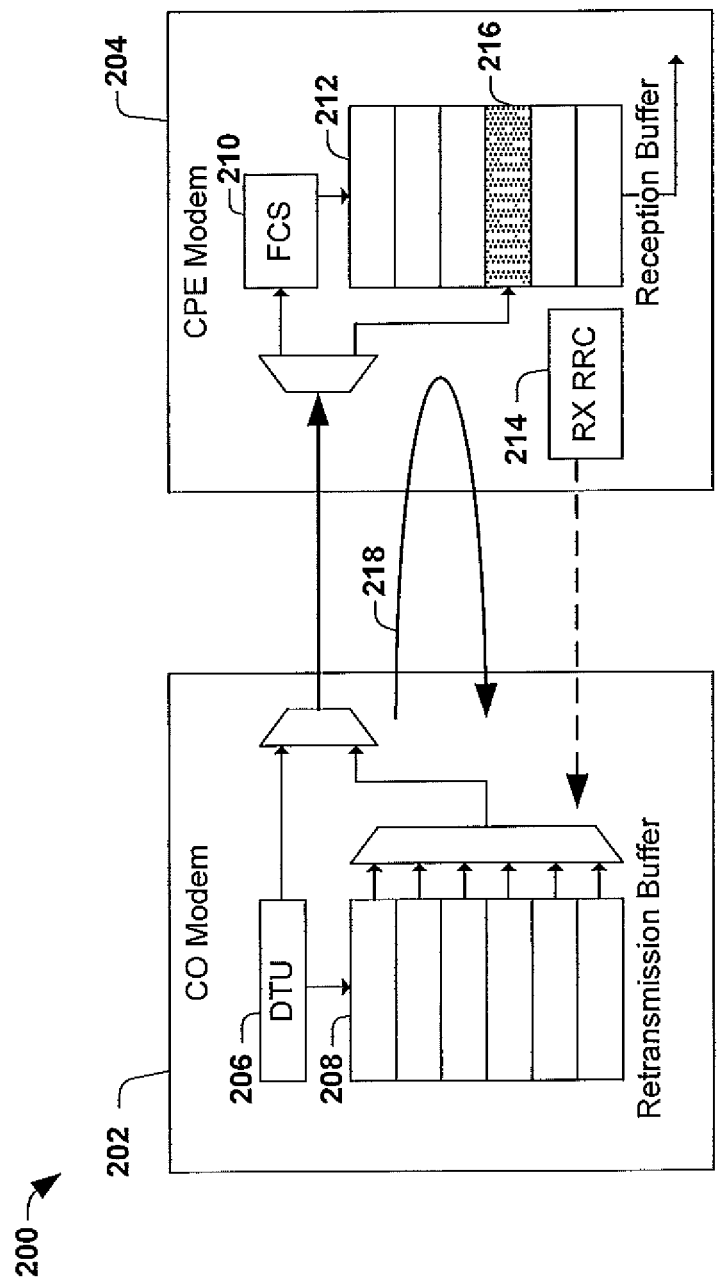
FIG. 2 illustrates an embodiment of a DSL communication system.

FIG. 2 illustrates an embodiment of a DSL communication system 200 for error detection and retransmission comprising a CO modem 202 and a CPE modem 204. In the CO modem 202 a data stream (not shown) is packaged into DTUs 206 and transmitted to the CPE modem 204. For the purpose of possible retransmission, a copy of each transmitted DTU is stored in a retransmission buffer 208. Upon receipt of a DTU the CPE modem 204 performs a frame sequence check (FSC) in an error detection unit 210 to determine if the DTU has been corrupted during transmission. All received DTUs are stored in a reception buffer 212, and an acknowledgement is generated and sent back to the CO modem 202 via the retransmission request channel (RRC) 214. A positive acknowledgement indicates that the DTU was received and that no errors were detected. A negative acknowledgement indicates that errors were detected. All unacknowledged or negatively acknowledged DTUs are resent by the transmitter. Negatively acknowledged DTUs are replaced 216 in the reception buffer 212.

The retransmission strategy of the of a DSL communications arrangement 200 requires buffering of all sent and received DTUs. The buffer size is determined by the DTU size, as well as the roundtrip time delay 218 between sending a DTU and receiving an acknowledgement. The size of the retransmission buffer 208 is such that it can hold a certain quantity (Qtx) of DTUs. Therefore, if a DTU goes unacknowledged after a transmission of Qtx subsequent DTUs then it is automatically retransmitted. Retransmission reduces the overall throughput of the DSL communications arrangement 200.

Figure 3:
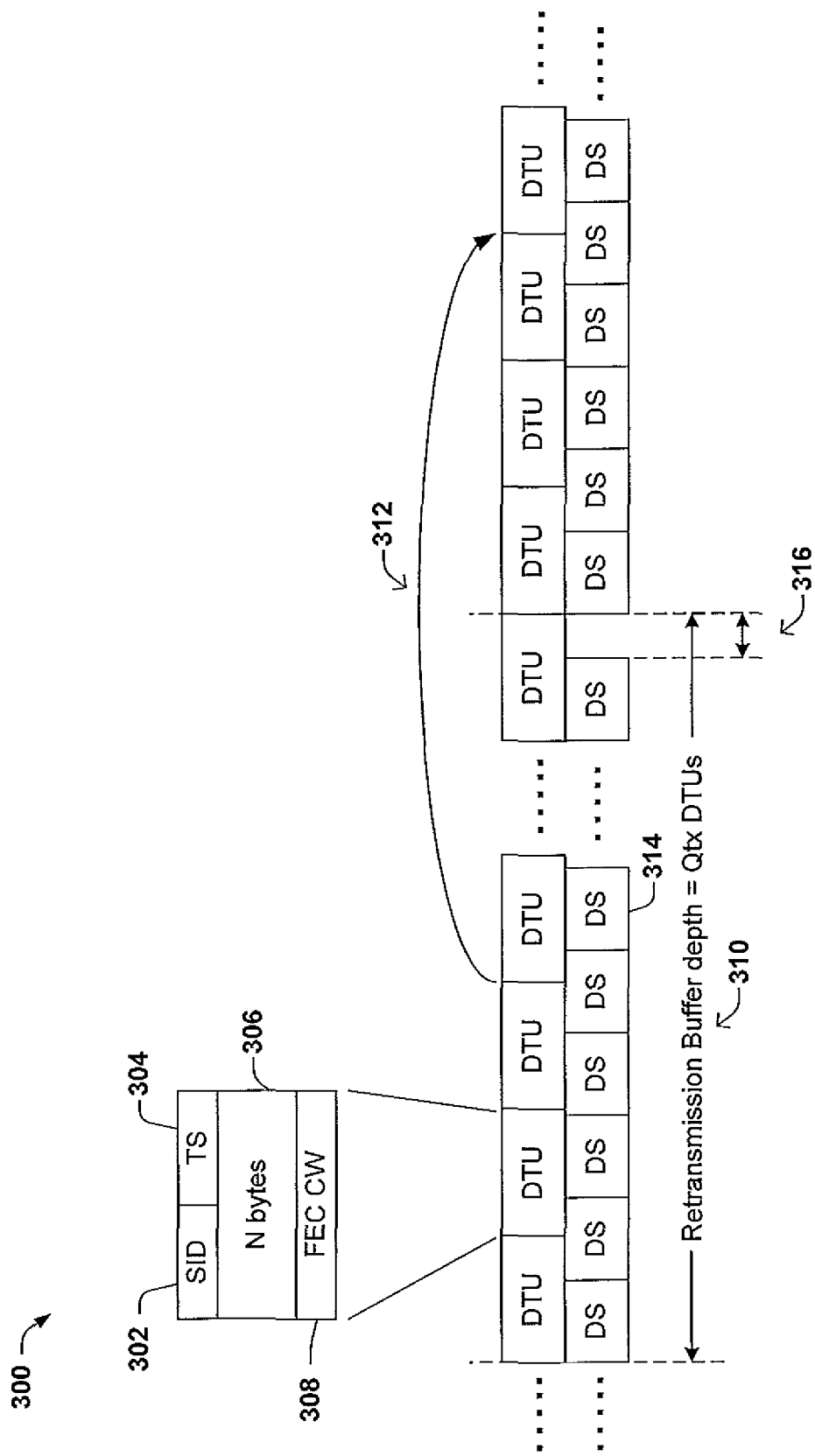
FIG. 3 illustrates a DTU embodiment.

FIG. 3 illustrates a DTU embodiment 300 comprising a Sequence Identifier (SID) 302 for ordering of a plurality of DTUs in a receiver, a Time Stamp (TS) 304 indicating when the DTU was transmitted, N bytes of transmitted data 306, and a Forward Error Correction Codeword (FEC CW) 308 for error detection. DTU retransmission 312 takes place if a transmitter does not receive a positive acknowledgement from a receiver within a time period that is equivalent to the transmitter's retransmission buffer depth of Qtx DTUs 310. The time period corresponding to the buffer depth 310 may be expressed in terms of Data Symbols (DS) 314. Note that a DTU size need not correspond to an integer number of DS symbols 314, or visa-versa. In this embodiment there is a worst-case DTU-DS mis-alignment 316 between an integer number of DTUs and integer number of DS symbols.

Figure 4:
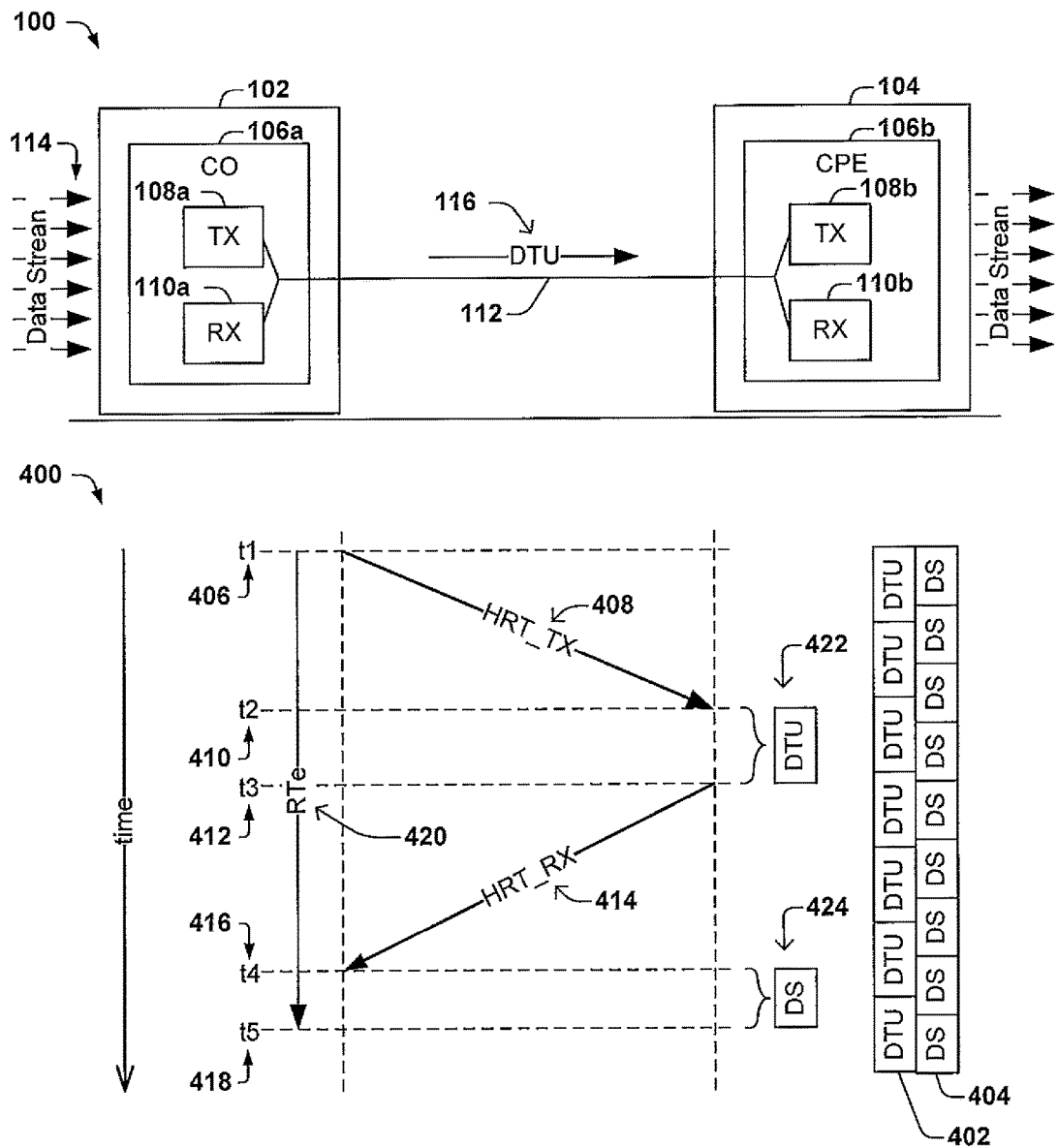
FIG. 4 illustrates a general start-up protocol for some embodiments of the DSL communication system.

FIG. 4 illustrates a general start-up protocol 400 for some embodiments of the DSL communication system 100, wherein a DTU size 402 is measured in terms of a Data Symbol unit 404, and depends upon a roundtrip time delay between transmitting a DTU and receiving an acknowledgement that the DTU was received. During start-up of the DSL communication system 100, each side, the operator's site 102, and the subscriber's site 104, communicates its half roundtrip (HRT). At 406 a first transceiver 106a communicates an estimated HRT of the transmitted data (HRT_TX) 408, which is received by a second transceiver 106b at 410. At 412 the second transceiver 106b communicates an estimated HRT of the acknowledgement (HRT_RX) 414, which is received by the first transceiver 106b at 416. Note that a HRT can generally be expressed with a symbol part and DTU part (e.g., for a DMT system, HRT=6 DMT symbols plus 1 DTU).

The roundtrip time delay of the embodiment of FIG. 4 must also account for the time it takes for the second transceiver 106b to generate an acknowledgement that a DTU was received (e.g., one DTU) 422, as well as a worst-case misalignment between the DTU size 402 and the Data Symbol unit 404 (e.g., one DS). Therefore, the estimated roundtrip time delay (RTe) 420 is determined as the sum of HRT_TX 408 and HRT_RX 414, plus one DTU to account for the time it takes for a receiver to generate an acknowledgement 422, plus one symbol to account for DTU-DS mis-alignment 424.

To measure the roundtrip time delay for a plurality of DTUs the roundtrip measurement protocol 132 of the embodiment of FIG. 1 may be employed. However, each DTU must be distinguished. This can be achieved by tracking an absolute DTU count (AbsDTUcount) for both transmitted and received DTUs, as well as the number of consecutive DTUs positively acknowledged by a receiver (ConsecGoodDTUs).

Figure 5:
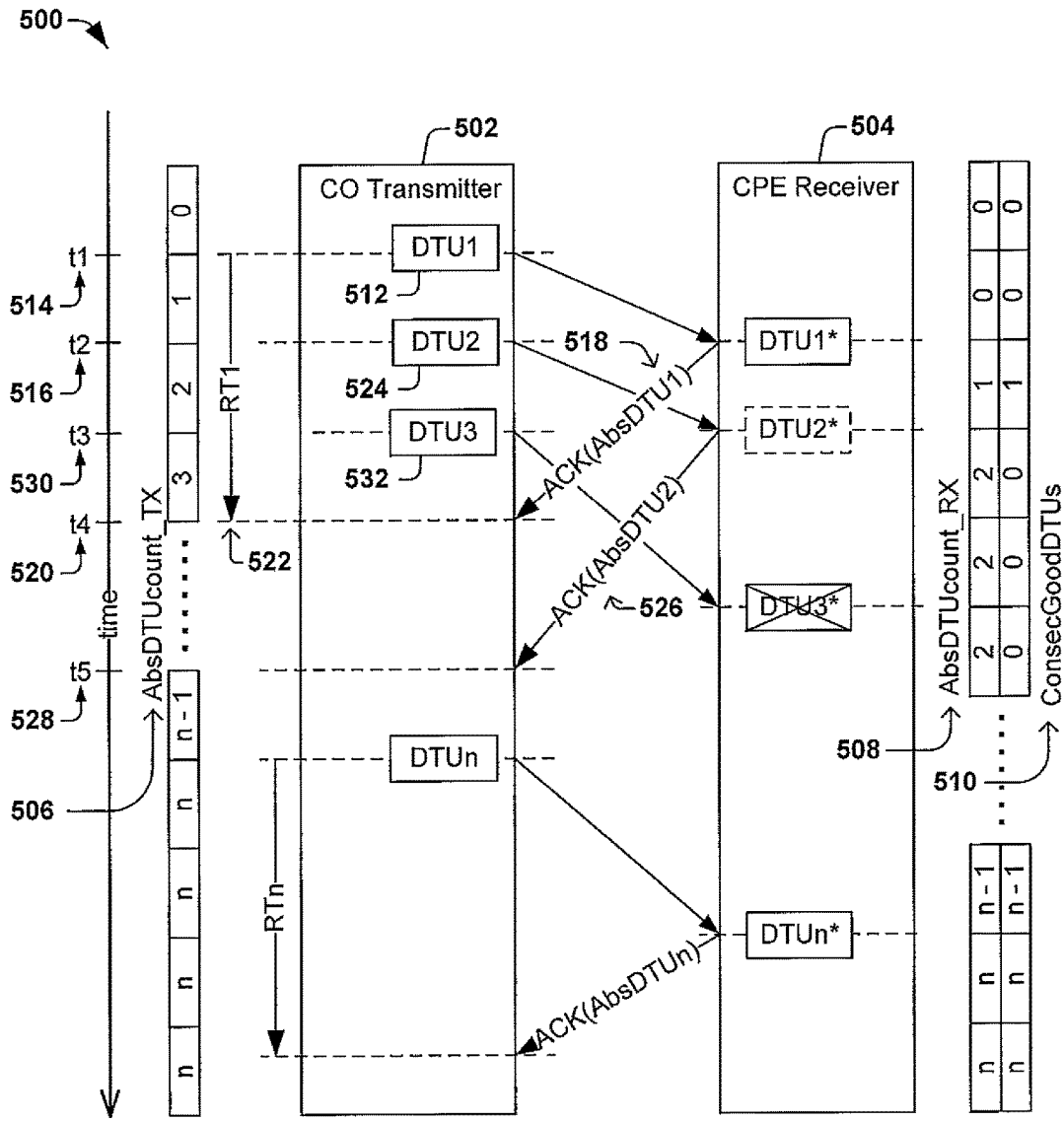
FIG. 5 illustrates a simple embodiment of a communication system.

FIG. 5 illustrates a simple embodiment of a communication system 500 comprising a CO transmitter 502 and a CPE receiver 504. After initialization (e.g., training) the CO transmitter 502 logs an AbsDTUcount (AbsDTUcount_TX) 506 for all transmitted DTUs, while the CPE receiver 504 synchronously runs an AbsDTUcount (AbsDTUcount_RX) 508 for the purpose of acknowledgement reporting. The CPE receiver 504 also tracks ConsecGoodDTUs 510 to account for instances where a DTU is received, but errors are detected and a retransmission request is sent to the CO transmitter 502.

The CO transmitter 502 of the communication system 500 transmits a first DTU (DTU1) 512 at 514, and logs AbsDTUcount_TX=1. At 516 the CPE receiver 504 receives DTU1 512, logs AbsDTUcount_RX=1, logs ConsecGoodDTUs=1, and sends a first positive acknowledgement 518 indicating that DTU1 was received. At 520 the CO transmitter 502 receives the first positive acknowledgement 518, determines that the difference between AbsDTUcount_TX and AbsDTUcount_RX is 0, and thus measures a first roundtrip time delay (RT1) 522. At 516 the CO transmitter 502 transmits a second DTU (DTU2) 524 and logs AbsDTUcount_TX=2. At 530 the CPE receiver 504 receives DTU2 524, but determines that it has been corrupted. The CPE receiver 504 logs AbsDTUcount_RX=2, but resets ConsecGoodDTUs=0, and generates a first negative acknowledgement 526. The CO transmitter 502 receives the first negative acknowledgement 526 at 528, and determines that the difference between AbsDTUcount_TX and AbsD- TUcount_RX is 0, but that ConsecGoodDTUs=0 such that DTU2 524 must be retransmitted. A roundtrip time delay for DTU2 524 cannot be measured until successful retransmission and acknowledgement by the CPE receiver 504. At 530 a third DTU (DTU3) 532 is transmitted by the CO transmitter 502, which logs AbsDTUcount_TX=3, but is not received by the CPE receiver 504 (AbsDTUcount_RX=2). Since no acknowledgement is generated by the receiver 504 for DTU3 530, a roundtrip time delay for DTU3 (RT3) cannot be measured until successful retransmission.

For transmission of a plurality of n DTUs an acknowledgement that AbsDTUcount_TX=AbsDTUcount_RX=ConsecGoodDTUs=n indicates that all transmitted DTUs (i.e., DTU1, DTU2, ... DTUn) have been received with no corruption. Therefore, the roundtrip for each DTU can be measured. An acknowledgement that AbsDTUcount_TX=AbsDTUcount_RX, but that ConsecGoodDTUs<n implies that all transmitted DTUs have been received, but that one or more of the DTUs have been corrupted. The SID for a positively acknowledged DTU can be used for identification and determination of its roundtrip time delay. An acknowledgement that AbsDTUcount_TX≠AbsDTUcount_RX indicates that one or more DTUs have not been received. The roundtrip time delay for an unacknowledged DTU can only be determined after successful retransmission.

In some embodiments a DTU stream is CBR (constant bit rate) without any gaps between transmitted DTUs. Independent from the user traffic stream, there can be as many as approximately 1000 roundtrip time delay measurements within one second. As such, it is useful to measure the roundtrip time delay for a plurality of DTUs and determine a maximum value within a given period.

Figure 6:
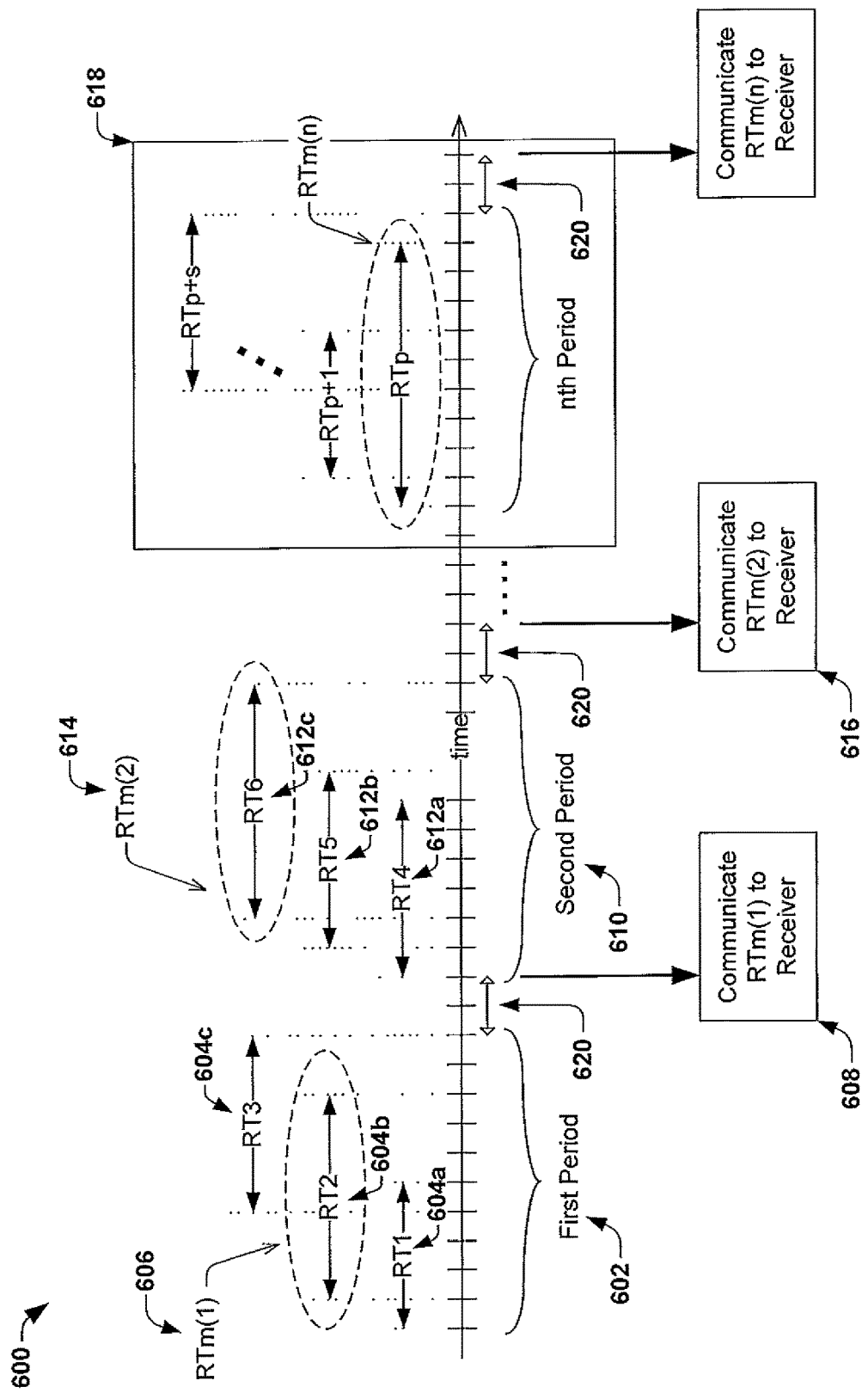
FIG. 6 illustrates an embodiment for periodically measuring a roundtrip time delay in a transmitter and communicating to a receiver.

FIG. 6 illustrates an embodiment 600 for periodically measuring a roundtrip time delay in a transmitter and communicating to a receiver. Within a first period 602 the transmitter (not shown) measures a plurality of roundtrip time delays 604a-604c, determines a first maximum roundtrip time delay RTm(1) 606, and communicates it to a receiver 608. This process is repeated within a second period 610 for a plurality of roundtrip time delays 612a-612c to determine a second maximum roundtrip time delay RTm(2) 614, which is communicated to the receiver 616. This process repeats 618 throughout the transmission. Note that while in this embodiment there is an offset 620 of two clock pulses between the final roundtrip measurement within a given period and the communication of the maximum measured roundtrip to a receiver. In general the offset 620 can be any value less than the measurement period.

Figure 7:
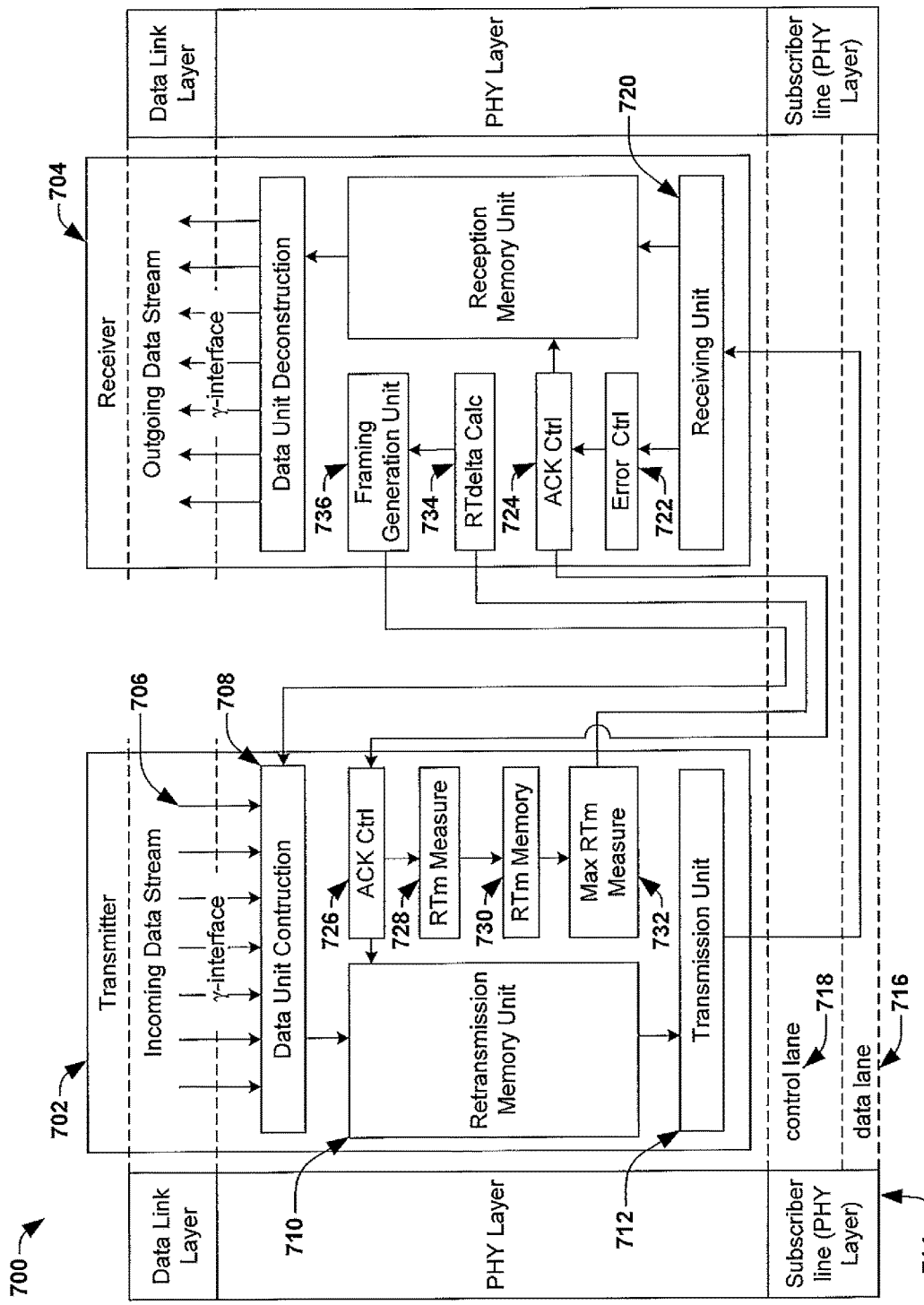
FIG. 7 illustrates a schematic of a DSL communication system for roundtrip measurement and data framing correction according to one embodiment of an online correction.

FIG. 7 illustrates a schematic of a DSL communication system 700 for roundtrip measurement and data framing correction according to one embodiment of an online correction (i.e., during showtime). A transmitter 702 receives an incoming data stream 706. A data unit construction module 708 within the transmitter 702 frames the data stream 706 into DTUs based on an estimated roundtrip time delay (RTe) performed by a receiver 704 during training. A copy of each transmitted DTU is stored in a retransmission memory unit 710 for the purpose of possible retransmission. The DTUs are then transmitted via a transmission unit 712 to the receiver 704 over a data lane 716 of a subscriber line 714. The DTUs are received by a receiving unit 720. An error controller 722 performs error checking on each received DTU to determine if it has been corrupted. A first acknowledgement controller 724 within the receiver 704 sends an acknowledgement for each received DTU to a second acknowledgement controller 726 within the transmitter 702 via a control lane 718 of the subscriber line 714. The second acknowledgement controller 726 is coupled to a roundtrip measurement unit 728 which measured the roundtrip time delay for each acknowledged DTU, and stores the measured roundtrip values in a roundtrip memory unit 730. A maximum roundtrip measurement unit 732 calculates a maximum roundtrip time delay (RTm) within a predetermined period. The roundtrip measurement unit 732 communicates RTm to a roundtrip delta calculating unit 734 via a control lane 718 of the subscriber line 714. As described previously, the communication from the roundtrip measurement unit 732 to the roundtrip delta calculating unit 734 occurs with an offset that is smaller than the predetermined period. The offset is typically applied after showtime entry or after framing parameter change to allow for link stability. For the communication system 700 of this embodiment the preferred is a period of 60 seconds with an offset of 50 seconds.

The roundtrip delta calculating unit 734 calculates a roundtrip delta (RTdelta) as the difference between RTe and RTm. If RTdelta<0 then the measured roundtrip is smaller than the estimated roundtrip and a framing correction is possible. Additionally, if RTdelta is greater than a predetermined threshold (RTdeltaTHR), taken to be the DTU size in this embodiment, then a framing correction could allow for the transmission of at least one additional DTU per RTm. The framing generation unit 736 receives the RTdelta information from the roundtrip delta calculating unit 734, and calculates a new DTU size based on RTdelta. The framing generation unit 736 then communicates the new DTU size to the data unit construction module 708 via the control lane 718 of the subscriber line 714. The data unit construction module 708 adjusts the size of subsequent DTUs accordingly.

It will be appreciate to one of skill in the art that the online correction of this embodiment may constitute a seamless rate adaption (SRA) or other online adaptations. Note that there can be no outstanding retransmission of any DTUs at the point where a framing parameter change takes place. All basic framing parameters can be changed in the SRA procedure so that it's possible to change the DTU size in symbols in the appropriate way. Only the type of framing is not permitted to change.

Figure 8:
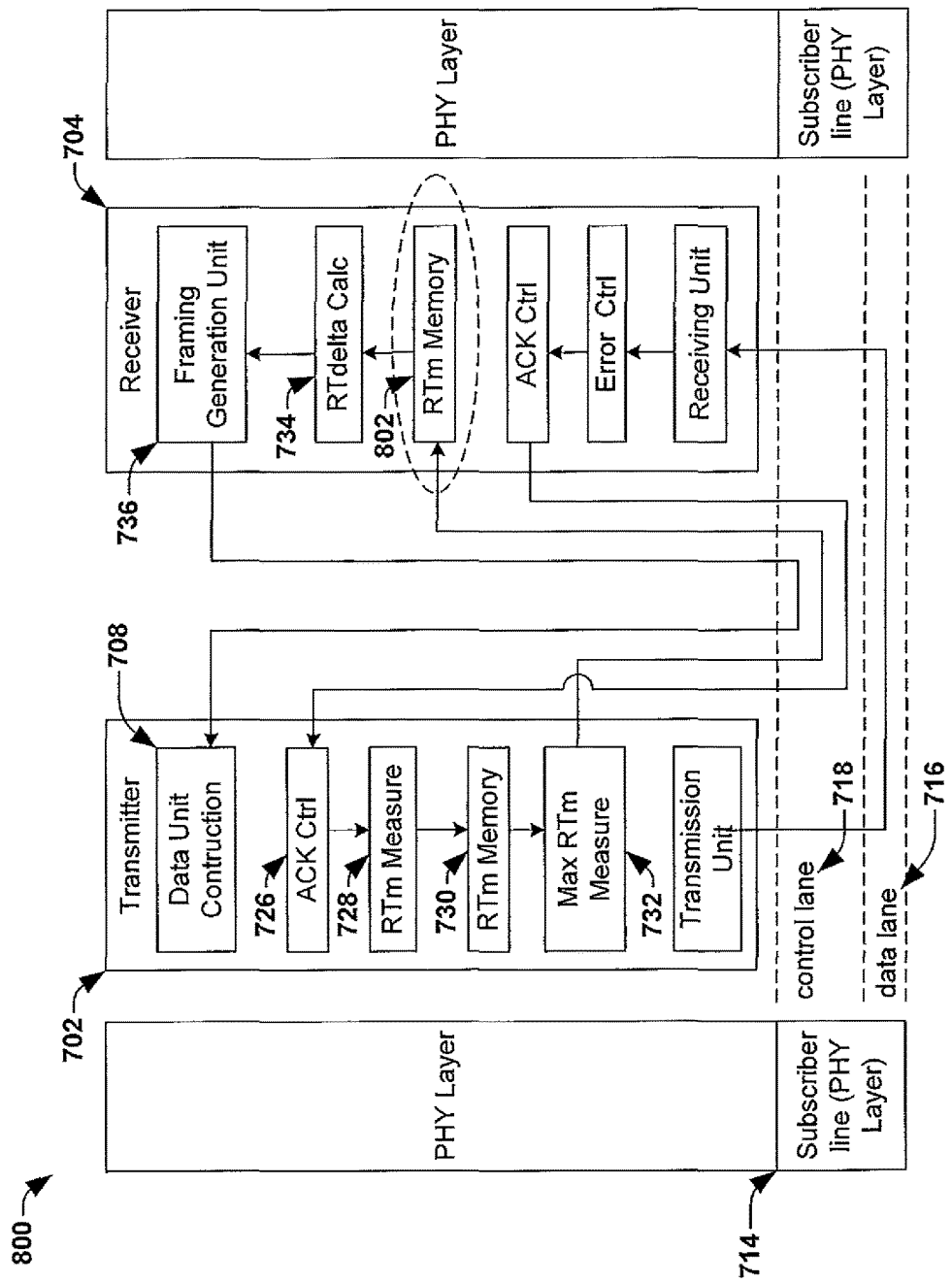
FIG. 8 illustrates a schematic of a DSL communication system for roundtrip measurement and data framing correction according to one embodiment of an offline correction applied at a receiver side.

FIG. 8 illustrates a schematic of a DSL communication system 800 for roundtrip measurement and data framing correction according to one embodiment of an offline correction applied at a receiver side (i.e., showtime exit and a return to training). In this embodiment, the receiver 704 of the previous embodiment 700 further comprises a roundtrip memory unit 802 coupled to the maximum roundtrip measurement unit 732. In the case of showtime exit for an offline correction, the roundtrip measurement unit 732 communicates the last valid RTm value to the roundtrip memory unit 802 via the control lane 718 of the subscriber line 714. The RTm value will be held in the roundtrip memory unit 802 for new training. The roundtrip memory unit 802 is coupled to the roundtrip delta calculating unit 734. During new training the roundtrip delta calculating unit 734 calculates RTdelta and determines a new DTU size as previously described in the embodiment of DSL communication system 700. If the receiver 704 can detect during start-up that it is still coupled to the same transmitter 702 (e.g., due to Vendor ID, Platform info, FW version, etc.), then the framing generation unit 736 communicates the new DTU size to the data unit construction module 708 via the control lane 718 of the subscriber line 714.

Figure 9:
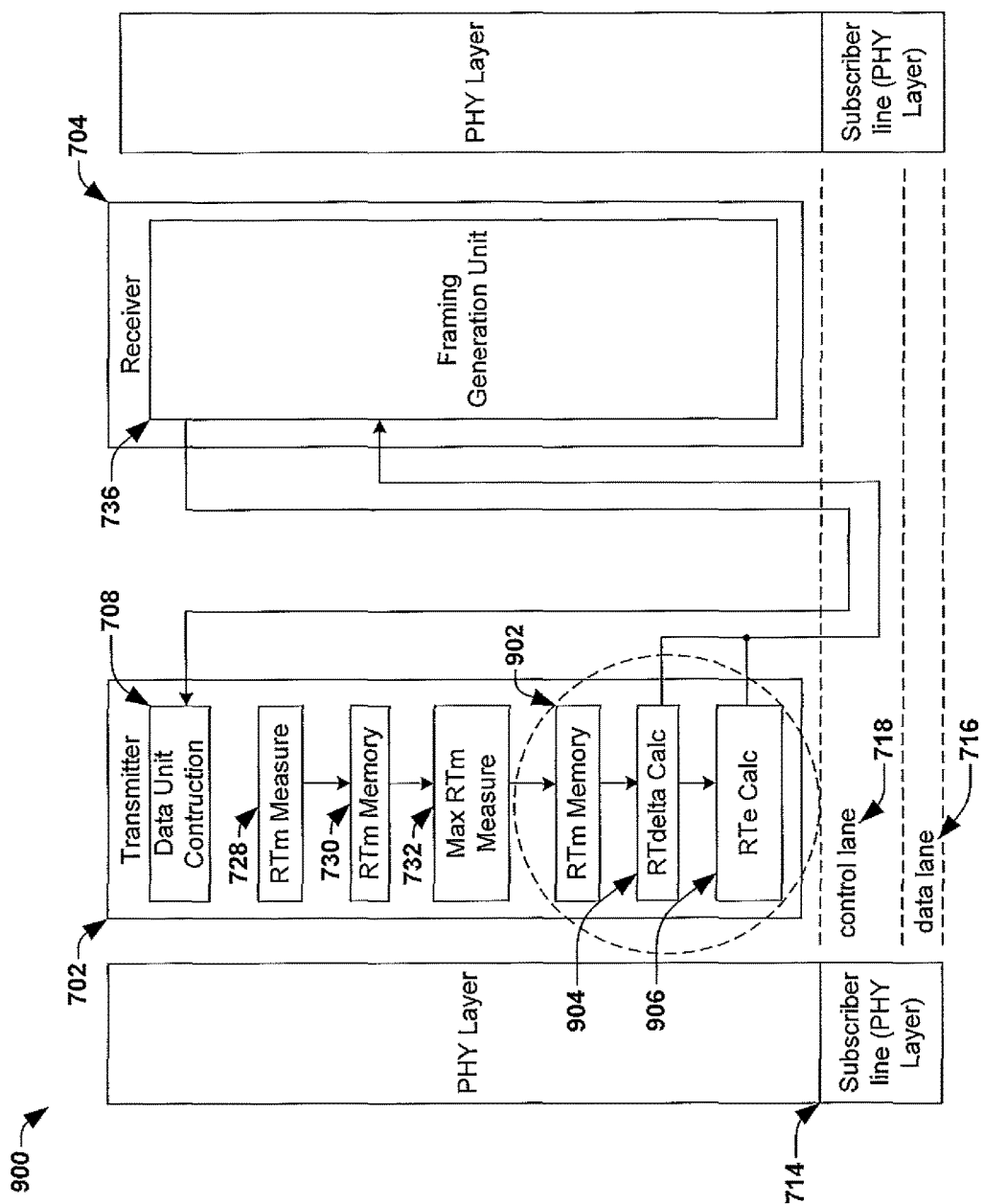
FIG. 9 illustrates a schematic of a DSL communication system for roundtrip measurement and data framing correction according to one embodiment of an offline correction applied at a transmitter side.

FIG. 9 illustrates a schematic of a DSL communication system 900 for roundtrip measurement and data framing correction according to one embodiment of an offline correction applied at a transmitter side. During start-up of the DSL communication system 900 the transmitter 702 and the receiver 704 each communicate its half roundtrip (HRT) as described previously in the general start-up protocol 400. However, in the current embodiment 900 a transmitter HRT_TX value, a receiver HRT_RX value, and a DTU size are expressed in a time unit of in Data Symbols (Tdtu). As a result there is no DTU-DS mis-alignment term required to determine an estimated roundtrip (RTe). For the DSL communication system 900 the transmitter 702 calculates RTe in a round trip estimation unit 906 during start-up as the sum of the transmitter HRT_TX value, the receiver HRT_RX value, and the DTU size in Data Symbols (Tdtu).

During showtime a maximum roundtrip measurement unit 732 calculates an RTm within a predetermined period as described in the previous embodiment 700. In the case of showtime exit for an offline correction, the roundtrip measurement unit 732 communicates the last valid RTm value to the roundtrip memory unit 902, where it will be held for new training. The roundtrip memory unit 902 is coupled to the roundtrip delta calculating unit 904. During new training the roundtrip delta calculating unit 734 calculates RTdelta as previously described in the embodiment of DSL communication system 700. However, rather than adjust the DTU size based on RTdelta the transmitter 702 adjusts its HRT_TX value such that the RTe value calculated in the round trip estimation unit 906 is minimized with respect to the last RTm value stored in the roundtrip memory unit 902. If the transmitter 702 can detect during start-up that it is still coupled to the same receiver 704 (e.g., due to Vendor ID, Platform info, FW version, etc.), then it will communicate the adjusted HRT_TX value to the framing generation unit 736.

Figure 10:
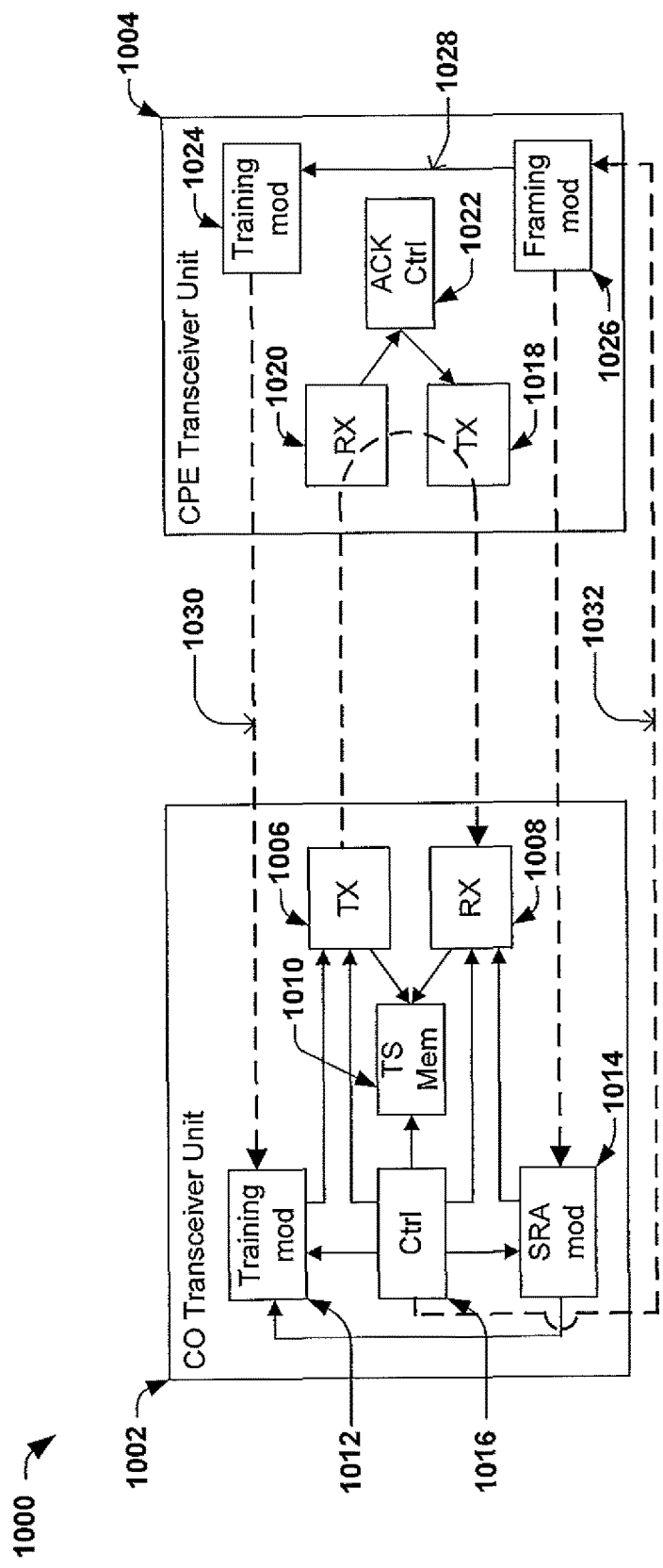
FIG. 10 illustrates a schematic of a DSL communication system for roundtrip estimation and seamless rate adaption.

FIG. 10 illustrates a schematic of a DSL communication system 1000 for roundtrip estimation and seamless rate adaption, comprising a CO transceiver unit 1002 and a CPE transceiver unit 1004. The CO transceiver unit 1002 comprises a first transmitter 1006 to transmit a DTU to a receiver, a first receiver 1008 to receive an acknowledgement that the DTU was received, a time stamp memory unit 1010 configured to store a transmission time stamp for the transmitted DTU. The stamp memory unit 1010 also stores an acknowledgement time stamp for the acknowledgement that the DTU was received. The CO transceiver unit 1002 further comprises a first training module 1012 configured to communicate with a receiver and receive inputs from the receiver that determine the size of a DTU prior to data transmission. The CO transceiver unit also comprises a seamless rate adaption module 1014 configured to communicate with a receiver and receive inputs from the receiver that determine the size of a DTU during data transmission, and a controller 1016 configured to operate the aforementioned components of the CO transceiver unit 1002 . . . . The CPE transceiver unit 1004 comprises a second transmitter 1018 to transmit an acknowledgement that a DTU was received, a second receiver 1020 to receive a DTU, and an acknowledgement controller 1022 to generate an acknowledgement for a received DTU. The CPE transceiver unit 1004 further comprises a second training module 1024 configured to communicate with a transmitter and send inputs to the transmitter that determine the size of a DTU prior to data transmission, and a framing module 1026 that determines a DTU size.

Prior to transmission of any data (i.e., during training) the framing module 1026 receives inputs for estimated HRT_TX and HRT_RX from the CO transceiver unit 1002 and the CPE transceiver unit 1004, respectively, and determines an estimated round trip time delay (RTe) in a manner previously described in the general start-up protocol 400. The framing module 1026 determines a DTU size based on RTe and communicates (1028) the DTU size to the second training module 1024, which in turn communicates (1030) the DTU size to the first training module 1012. The first training module 1012 relays the DTU size to a data unit construction module (not shown) such that an input data stream (also not shown) may be packaged into DTUs of the size determined by the framing module 1026.

During data transmission (i.e., showtime) a plurality of DTUs are transmitted and acknowledged, with a transmission time and an acknowledgement time stamp for each DTU stored in the time stamp memory unit 1010. The controller 1016 coupled to the time stamp memory unit 1010 can compare a transmission time stamp with an acknowledgement time for each transmitted DTU by utilizing the Sequence Identifier (SID) to determine a measured round trip time delay for each of the plurality of DTUs in a manner previously described in the embodiment of 500. The controller 1016 can also determine a maximum roundtrip time delay RTm for each of the plurality of DTUs manner previously described in the embodiment of 600, and communicated (1032) RTm to the framing module 1026. A data framing correction may then be applied by means of one of the previously described embodiments.

Figure 11:
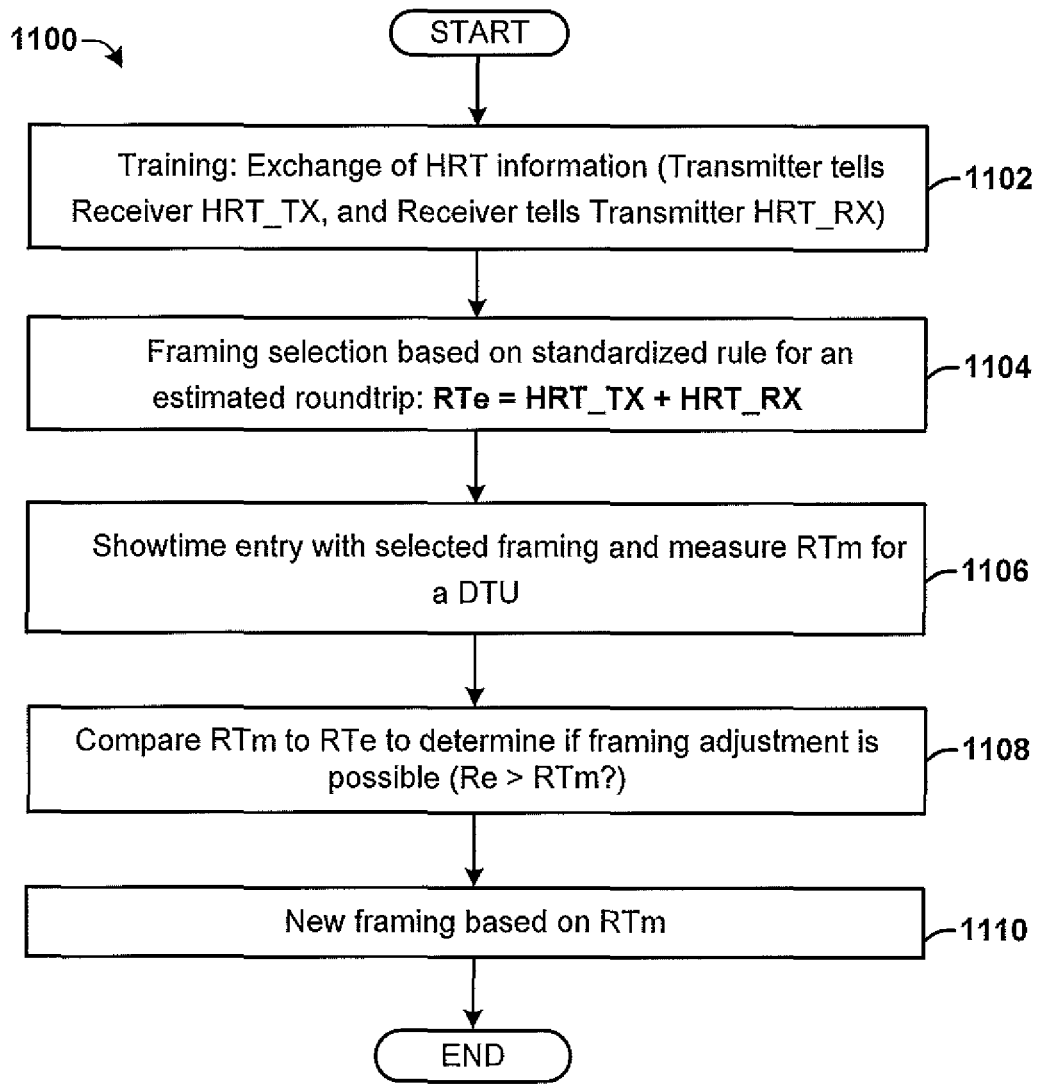
FIG. 11 illustrates a flow diagram for some embodiments of a method for processing data in a communication system.

FIG. 11 illustrates a flow diagram for some embodiments 1100 of a method for processing data in a communication system. The method 1100 processes an incoming data stream in a transmitter in the form of a data transmission unit (DTU), wherein the DTU size is based on an estimated roundtrip time delay determined during initialization (e.g., training) of the communication system. The DTU size may later be updated based on a measured roundtrip time delay (RTm) acquired during transmission (e.g., showtime). While method 1100 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At step 1102 the communication system enters training, wherein the transmitter communicates its half roundtrip (HRT_TX) to a receiver, and the receiver communicates its half roundtrip (HRT_RX) to the transmitter.

At step 1104 the communication system undergoes framing selection, wherein the DTU size is determined to be inversely-proportional to an estimated round trip (RTe) based on a standard rule that defines RTe as the sum of HRT_TX and HRT_RX.

At step 1106 the communication system enters showtime, wherein a DTU is transmitted from the transmitter to the receiver, the receiver sends an acknowledgement to the transmitter that the DTU was received, and a measured round trip time delay (RTm) is determined.

At step 1108 RTe is compared to RTm to determine if a framing correction (i.e., a DTU size adjustment) is possible.

At step 1110 the DTU size is adjusted via new framing for subsequent transmissions.

Figure 12:
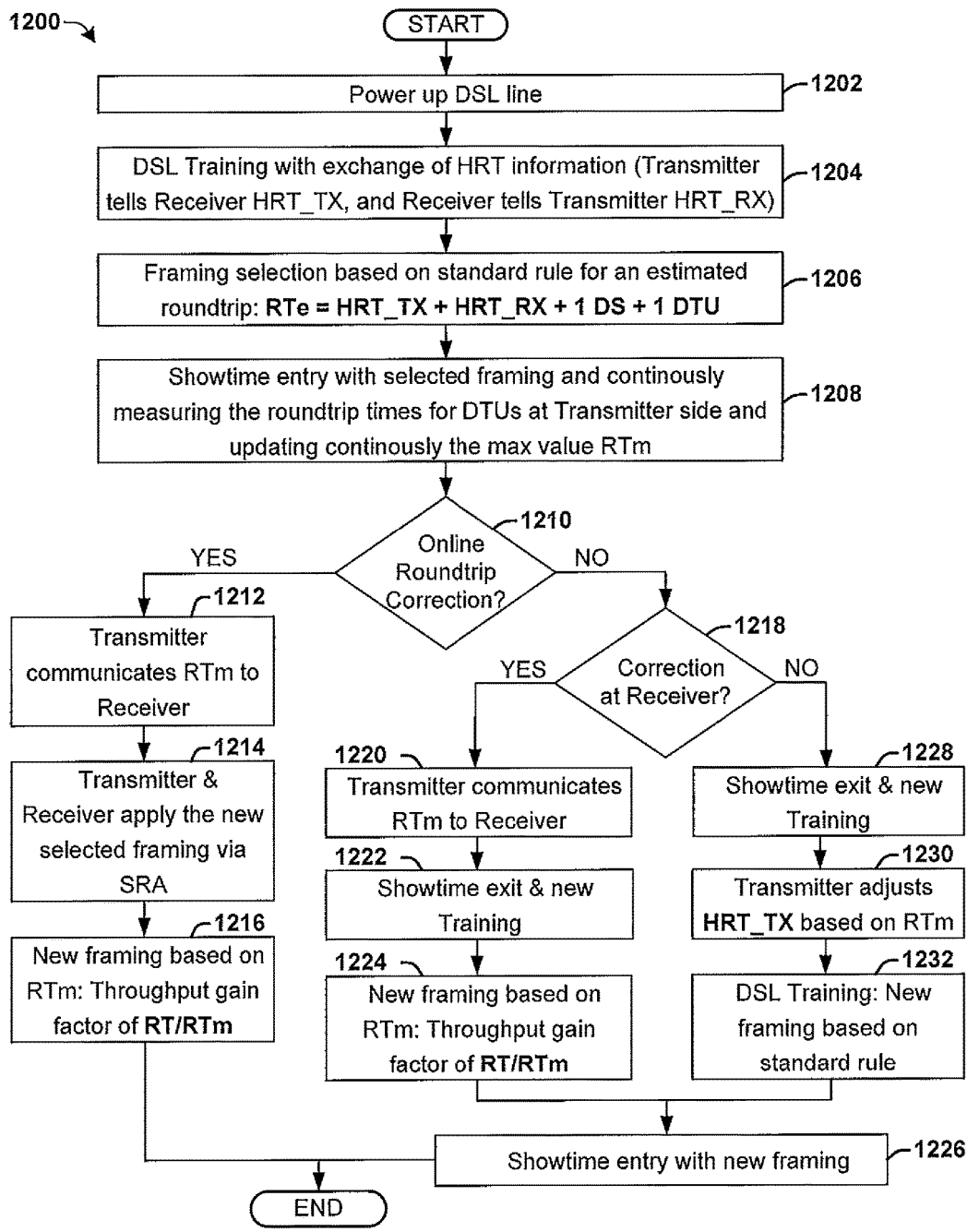
FIG. 12 illustrates a flow diagram for some embodiments of a method for processing data in a DSL communication system.

FIG. 12 illustrates a flow diagram for some embodiments 1200 of a method for processing data in a DSL communication system. The method 1200 processes an incoming data stream in a transmitter in the form of a plurality of DTUs, wherein a DTU size based on an estimated roundtrip time delay determined by a receiver during training. The DTU size may later be updated based on a maximum measured roundtrip time delay (RTm) for all transmitted DTUs acquired by the transmitter during showtime. While method 1200 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At step 1202 the DSL communication system is powered on.

At step 1204 the DSL communication system enters training, wherein the transmitter communicates its half roundtrip (HRT_TX) to a receiver, and the receiver communicates its half roundtrip (HRT_RX) to the transmitter.

At step 1206 the DSL communication system undergoes framing selection, wherein the DTU size is determined to be inversely-proportional to an estimated round trip (RTe) based on a standard rule that defines RTe as the sum of HRT_TX and HRT_RX, plus one DTU to account for the time it takes for a receiver to generate an acknowledgement, plus one symbol to account for DTU-DS mis-alignment.

At step 1208 the DSL communication system enters showtime, wherein a plurality of DTUs are transmitted from the transmitter to the receiver, the receiver sends an acknowledgement to the transmitter for each received DTU, and a maximum measured round trip time delay (RTm) is determined for all DTUs.

At step 1210 a determination is made as to whether the framing correction will be made via an online correction (i.e., during showtime), or via an offline correction (i.e., showtime exit and a return to training).

At step 1212, if a determination is made to perform a framing correction via an online correction (YES at 1210), then the transmitter communicates RTm to the receiver.

At step 1214 the transmitter and receiver apply a framing correction via a seamless rate adaption (SRA). Note that there can be no outstanding retransmission of any DTUs at the point where a framing parameter change takes place. All basic framing parameters can be changed in the SRA procedure so that it's possible to change the DTU size in symbols in the appropriate way. Only the type of framing is not permitted to change.

At step 1216 the new framing takes effect for DTU transmission, resulting in a throughput gain factor of RT/RTm.

At step 1218, if a determination is made to perform a framing correction via an offline correction (NO at 1210), then a determination is made as to whether the framing correction will take place in the receiver or the transmitter.

At step 1220, if a determination is made to perform a framing correction in the receiver (YES at 1218), then the transmitter communicates RTm to the receiver.

At step 1222 the DSL communication system exits showtime and enters new training.

At step 1224 new framing is determined for DTU transmission, which will result in a throughput gain factor of RT/RTm.

At step 1226 the DSL communication system enters showtime and new framing takes effect for DTU transmission.

At step 1228, if a determination is made to perform a framing correction in the transmitter (NO at 1218), then the DSL communication system exits showtime and enters new training.

At step 1230 the transmitter adjusts its HRT_TX value such that the RTe is minimized with respect to the RTm value.

At step 1232 the DSL communication system re-enters training, wherein the transmitter communicates its adjusted HRT_TX value determined in step 1230 to a receiver, and the receiver communicates HRT_RX to the transmitter. The DSL communication system undergoes a new framing selection again based on the standard rule from step 1206.

At step 1226 the DSL communication system again enters showtime and new framing takes effect for DTU transmission.

Thus, the above described embodiments are retransmission roundtrip correction schemes that optimize the size of the data unit thus the throughput of a communication system. Although the invention has been illustrated and described with respect to one or more implementations, alterations and/or modifications may be made to the illustrated examples without departing from the spirit and scope of the appended claims. For example, although certain embodiments of the invention have been described with respect to ADSL and VDSL communication systems, the invention is applicable to any communication system. For example, other communication systems could include cell phones, pagers, mobile communication devices, industrial control systems, wide area networks, local area networks, among others. These and other systems could communicate over various types of communication medium, including but not limited to: wireless mediums, optical fiber, coaxial cable, powerline, and many others.

In addition, although various illustrated embodiments are illustrated as a hardware structure, the functionality and corresponding features of the present device can also be performed by appropriate software routines or a combination of hardware and software.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for generating a new framing for communication between a transmitter on a transmission side and a receiver on a receiver side in a communication system that employs a scheme that transmits data transmission units according to a sequential clock timing, comprising:
- determining a data transmission unit size depending on an estimated roundtrip timing;
- measuring an actual roundtrip timing of a data transmission unit at the transmitter;
- wherein measuring the actual roundtrip timing is based on a plurality of received acknowledge signals that indicate that the receiver acknowledges receipt of the data transmission unit;
- calculating a difference between the estimated roundtrip timing and the actual roundtrip timing in the receiver, wherein the estimated roundtrip timing is based on half roundtrip to a receiver and half roundtrip to a transmitter;
- comparing the difference between the estimated roundtrip timing and the actual roundtrip timing to a predetermined threshold; and
- redefining the data transmission unit size if the difference between the estimated roundtrip timing and the actual roundtrip timing is larger than the predetermined threshold.

2. The method of claim 1, wherein generating a new framing at least in part generates new frames during normal operation of the transmitter or receiver.

3. The method of claim 1, further comprising generating the actual roundtrip timing based on a time difference between a time of a received acknowledge signal and a time when the data transmission unit was sent.

4. The method of claim 1, wherein generating the new framing for data transmission is performed on the transmission side.

5. The method of claim 1, further comprising transmitting the actual roundtrip timing to the receiver.

6. The method of claim 1, wherein generating the new framing for data transmission is performed on the receiving side.

7. The method of claim 1, further comprising estimating a half roundtrip timing from the transmitter to the receiver.

8. The method of claim 7, wherein generating a new framing for data transmission uses the half roundtrip timing from the transmitter to the receiver during a training or retraining of the transmitter or receiver.

9. The method of claim 1, further comprising:
- determining an estimated roundtrip time delay during initialization; and
- defining a first data transmission unit size based on the estimated roundtrip time delay prior to transmission of the first data transmission unit.

10. The method of claim 1, wherein determining the new data transmission unit size comprising determining the new data transmission unit size as inversely proportional to the actual roundtrip timing.

11. A method for generating a new framing for communication between a transmitter on a transmission side and a receiver on a receiver side in a communication system that employs a scheme that transmits data transmission units according to a sequential clock timing, comprising:
- determining an estimated roundtrip timing during initialization, wherein the estimated roundtrip timing is determined based on half roundtrip to a receiver and half roundtrip to a transmitter;
- determining a data transmission unit size depending on the estimated roundtrip timing;
- measuring an actual roundtrip timing of a data transmission unit at the transmitter, wherein the measuring the actual roundtrip timing is based on a plurality of received acknowledge signals that indicate that the receiver acknowledges receipt of the data transmission unit;
- calculating a difference between the estimated roundtrip timing and the actual roundtrip timing in one of the receiver or the transmitter;
- comparing the difference between the estimated roundtrip timing and the actual roundtrip timing to a predetermined threshold in one of the receiver or the transmitter;
- redefining the data transmission unit size in the receiver if the difference between the estimated roundtrip timing and the actual roundtrip timing is larger than the predetermined threshold; and
- transmitting the data transmission units with the redefined data transmission unit size from the transmitter to the receiver.

12. The method of claim 11, further comprising calculating a measured roundtrip timing for the plurality of data transmission units.

13. The method of claim 11, further comprising calculating a maximum measured roundtrip timing as the maximum measured roundtrip time delay of the plurality of data transmission units.

14. The method of claim 13, wherein generating a new framing for data transmission using at least the half roundtrip timing from the transmitter to the receiver and an estimated half roundtrip timing from the receiver to the transmitter.

15. The method of claim 11, further comprising estimating a half roundtrip timing from the transmitter to the receiver.

16. The method of claim 11, further comprising estimating a half roundtrip timing from the receiver to the transmitter.

17. The method of claim 11, further comprising generating a new framing for data transmission using at least the half roundtrip timing from the transmitter to the receiver.

18. The method of claim 11, further comprising changing a data transmission rate of the data transmission units based on a comparison of the estimated roundtrip timing, a maximum roundtrip timing, and a predetermined threshold.

19. The method of claim 18, further comprising communicating the maximum roundtrip timing to the receiver.

20. The method of claim 19, wherein communicating the measured roundtrip timing comprises periodically communicating the maximum roundtrip timing to the receiver on a predetermined period.

21. The method of claim 20, further comprising delaying a communication of the maximum roundtrip timing to the receiver by a period offset that is smaller than the predetermined period.

22. The method of claim 11, further comprising:
- calculating the difference between the estimated roundtrip timing and the actual roundtrip timing in the receiver;
- comparing the difference between the estimated roundtrip timing and the actual roundtrip timing to a predetermined threshold in the receiver; and
- redefining the data transmission unit size in the receiver if the difference between the estimated roundtrip timing and the actual roundtrip timing is larger than the predetermined threshold.

23. The method of claim 22, further comprising suspending transmission of data transmission units from the transmitter to the receiver and returning to initialization.

24. The method of claim 22, further comprising redefining a half roundtrip timing if the difference between the estimated roundtrip timing and the actual roundtrip timing is larger than the predetermined threshold such that the estimated roundtrip timing matches (must be greater than or equal to) the value of a maximum measured roundtrip timing.

25. A communication apparatus that is configured to generate a new framing transmission in a communication system that employs a scheme that transmits data transmission units according to a sequential clock timing, the apparatus comprising:
- a receiver, the receiver being adapted to receive data transmission units and to transmit acknowledge signals that indicate that the receiver acknowledges receipt of the data transmission unit;
- the receiver comprising a physical layer calculating circuit configured to calculate a difference between an estimated roundtrip timing and an actual roundtrip timing, the estimated roundtrip timing being based on half roundtrip to the receiver and half roundtrip to a transmitter, and an actual roundtrip timing based on the acknowledge signals;
- the receiver comprising a physical layer framing generation circuit configured to compare the difference between the estimated roundtrip timing and the actual roundtrip timing to a predetermined threshold and to redefine a data transmission unit size in the receiver if the difference between the estimated roundtrip timing and the actual roundtrip timing is larger than the predetermined threshold; and
- a physical layer framing circuit that determines a new data transmission unit size for data transmission using the actual roundtrip timing.

26. The apparatus of claim 25, further comprising a transceiver comprising training module circuit configured to communicate with the receiver and receive inputs from the receiver that determine the size of the data transmission unit prior to data transmission.

27. The apparatus of claim 25, further comprising a time stamp memory unit configured to store a transmission time stamp for the transmitted data transmission unit and an acknowledgement time stamp for the acknowledgement that the data transmission unit was received;
- wherein the retransmission unit measures the roundtrip timing based on the time stamp and the acknowledgement time stamp.

28. The apparatus of claim 25, further comprising a transceiver comprising a seamless rate adaption circuit configured to communicate with a receiver and receive inputs from the receiver that determine the size of the data transmission units during data transmission.

29. The communication apparatus of claim 25, wherein the transmitter further comprises a data unit construction block that takes an incoming data stream and packages it into data transmission units.

30. The communication apparatus of claim 25, wherein the transmitter further comprises a retransmission memory unit configured to store the data transmission unit.

31. The communication apparatus of claim 25, wherein the transmitter further comprises an acknowledgement controller configured to wait up to a predetermined time to receive an acknowledgement from the receiver that the data transmission unit was received.

32. The communication apparatus of claim 25, wherein the transmitter further comprises a roundtrip measurement unit configured to calculate a measured roundtrip timing as a timing interval between the transmission time stamp and the acknowledgment time stamp.

33. The communication apparatus of claim 32, wherein the roundtrip measurement unit further comprises:
- a configuration to calculate a measured roundtrip timing for each of a plurality of data transmission units transmitted as a timing interval between the transmission timing stamp and the acknowledgement timing stamp for each respective data transmission unit; and
- a configuration to communicate the measured roundtrip timing to a framing generation unit of the receiver.

34. The communication apparatus of claim 25, wherein the transmitter further comprises a roundtrip memory unit to store the measured roundtrip timing.

35. The communication apparatus of claim 25, further comprising a transmitter comprising a maximum roundtrip measurement circuit configured to calculate a maximum measured roundtrip timing for the plurality of data transmission units.

36. The communication apparatus of claim 25, further comprising a transmitter comprising a calculating circuit configured to:
- calculate a difference between an estimated roundtrip timing and the measured roundtrip timing for a single data transmission unit; and
- communicate the difference between the estimated roundtrip timing and the measured roundtrip timing to the framing unit of the receiver.

37. The communication apparatus of claim 25, wherein the framing unit further comprises:
- a start up configuration to determine an estimated roundtrip timing between transmission of a data transmission unit by the transmitter and receiving the acknowledgement from the receiver.

38. The communication apparatus of claim 37, wherein the framing unit further comprises a configuration to communicate the estimated roundtrip timing to the data unit construction block for the purpose of determining a data transmission unit size.

39. The communication apparatus of claim 25,
- wherein the retransmission unit measures the actual roundtrip timing periodically, and the framing unit determines the new data transmission unit size based on the roundtrip timing measured periodically.

* * * * *